(12) United States Patent
Fukutomi et al.

(10) Patent No.: US 7,590,157 B2
(45) Date of Patent: Sep. 15, 2009

(54) LASER NOISE ELIMINATION CIRCUIT AND OPTICAL DISC DEVICE

(75) Inventors: Yoshio Fukutomi, Chiba (JP); Toru Nagara, Tokyo (JP)

(73) Assignee: Sony Corporation (JP)

( * ) Notice: Subject to any disclaimer, the term of this patent is extended or adjusted under 35 U.S.C. 154(b) by 717 days.

(21) Appl. No.: 11/005,041

(22) Filed: Dec. 7, 2004

(65) Prior Publication Data

US 2005/0135222 A1   Jun. 23, 2005

(30) Foreign Application Priority Data

Dec. 17, 2003   (JP)   ............... 2003-419207

(51) Int. Cl.
*H01S 3/00* (2006.01)
*G11B 7/00* (2006.01)
(52) U.S. Cl. ............... 372/38.08; 372/38.01; 372/38.02; 369/124.01; 369/124.15
(58) Field of Classification Search ............... 372/38.08
See application file for complete search history.

(56) References Cited

U.S. PATENT DOCUMENTS

| 4,623,994 A | * | 11/1986 | Nabeshima et al. | ...... 369/30.22 |
| 5,410,531 A | * | 4/1995 | Tsujioka | ............... 369/124.03 |
| 5,491,682 A | * | 2/1996 | Dohmeier et al. | ...... 369/124.12 |
| 5,495,464 A | * | 2/1996 | Fujikawa et al. | ............ 369/121 |
| 2002/0085468 A1 | * | 7/2002 | Kobayashi | ............... 369/53.27 |
| 2002/0136111 A1 | * | 9/2002 | Kadlec et al. | ............ 369/44.29 |

FOREIGN PATENT DOCUMENTS

| JP | 60-093649 | 5/1985 |
| JP | 62-008337 | 1/1987 |
| JP | 05-046990 | 2/1993 |
| JP | 10-124919 | 5/1998 |

OTHER PUBLICATIONS

Janpanese Patent Application 2003-419207 OA issued on Jul. 13, 2006.

* cited by examiner

*Primary Examiner*—Minsun Harvey
*Assistant Examiner*—Sean Hagan
(74) *Attorney, Agent, or Firm*—Rader Fishman & Grauer PLLC; Ronald P. Kananen

(57) ABSTRACT

A laser noise elimination circuit raises the gain of a first TIA and at the same time reflected light from an optical disc of a laser beam is subjected to photoelectric conversion by means of a photo detector and a second TIA to obtain an RF signal. Then, the direct current component of the FPD signal obtained by photoelectric conversion of part of the laser beam by means of another photo detector and the first TIA is cut out by a high pass filter and then subtracted by a subtracter. The gain of the first TIA is raised in a read mode of operation for reading data from the optical disc and lowered in a write mode of operation for writing data onto the optical disc so as to always effectively eliminate only the laser noise from the RF signal and prevent the circuit from being saturated in a write mode.

23 Claims, 5 Drawing Sheets

LASER NOISE ELIMINATION CIRCUIT AND OPTICAL DISC DEVICE

BACKGROUND OF THE INVENTION

1. Field of the Invention

This invention relates to an optical disc device for reading data from and writing data to an optical disc and also to a laser noise elimination circuit for reducing laser noises.

2. Description of Related Art

Optical disc devices read/write data by irradiating a laser beam emitted from a semiconductor laser onto the surface of an optical disc. However, the signal reproduced from the optical disc is adversely affected by laser noises, which are boosted by return light from the optical disc and/or temperature changes. An LNC (laser noise canceling) method is known as laser noise reduction method for offsetting the laser noise component by subtracting the monitor output signal for APC (automatic power control) from the reproduced RF signal (see, inter alia, Patent Document 1: Japanese Patent Application Laid-Open Publication No. 10-124919).

Referring to FIG. 1 of the accompanying drawings, return light of the laser beam irradiated onto an optical disc (not shown) (reflected light from the optical disc) is subjected to photoelectric conversion by a main light detector 20 and then to current/voltage conversion by a TIA (Trance Impedance Amp) 22 to become an RF signal, which is then input to an arithmetic circuit 30. On the other hand, the laser beam is partly subjected to photoelectric conversion by a front photo detector 24 for APC monitoring and then to current/voltage conversion by a TIA 26 to become an FPD (front photo detector) signal, which is then input to the arithmetic circuit 30.

Both the RF signal and the FPD signal are those obtained by photoelectric conversion of the same laser beam and hence contain a laser noise component of the same phase. Therefore, the laser noise component of the RF signal is eliminated as the FPD signal is subtracted from the RF signal by the arithmetic circuit 30 and hence the RF signal is output with a reduced laser noise.

However, while the laser noise is reduced by the above described known laser noise canceling method, the servo signal component that is constituted by a component close to DC is affected to give rise to a problem of difficulty of accurately operating the servomechanism, because a direct current (DC) component is also subtracted from the RF signal when the FPD signal is subtracted from the RF signal.

Additionally, the gain of the FPD signal that is obtained from the front photo detector 24 is defined to be low relative to the RF signal so that no saturation may take place when the optical disc device receives a laser beam of a high output power level (the larger the speed multiple for data writing, the higher the output power level) in a write mode. Therefore, the amplitude level of the FPD signal falls remarkably when the optical disc device is made to operate in a read mode and the output power level of the laser beam falls. Then, the APC operation becomes difficult and, at the same time, the laser noise contained in the FPD signal and the circuit noise of the photo detector and that of the TIA circuit and other circuits show substantially the same level, depending on the circumstances, in the laser noise eliminating operation that is conducted in a data read mode. Then, the laser noise does not decrease but may inversely increase when the FPD signal is subtracted from the RF signal. This phenomenon becomes remarkable as the speed multiple is increased for data writing.

SUMMARY OF THE INVENTION

In view of the above identified circumstances, it is therefore an object of the present invention to provide a laser noise elimination circuit that can eliminate only the laser noise component from a highly accurate APC signal and an RF signal by raising the gain of the APC signal in a data reproducing operation and prevent the circuit from being saturated in a data writing operation so as to make the APC operate smoothly and also an optical disc device comprising such a laser noise elimination circuit.

In an aspect of the present invention, the above object is achieved by providing a laser noise elimination circuit comprising: a first photoelectric conversion means for photoelectric conversion of reflected light from an optical disc of the laser beam emitted from a laser beam source; a second photoelectric conversion means for photoelectric conversion of part of the laser beam emitted from the laser beam source and for changing the gain as a function of the output of the laser beam source; a filter means for cutting out the DC component of the second signal obtained from the second photoelectric conversion means; and a laser noise elimination means for eliminating the laser noise contained in the first signal obtained from the first photoelectric conversion means by using the output signal of the filter means; the circuit being adapted to raise the gain of the second photoelectric conversion means to operate the laser noise elimination means when the output of the laser beam source becomes low.

In a second aspect of the invention, there is provided an optical disc device for recording data on or reproducing data from an optical disc by irradiating a laser beam emitted from a laser beam source onto the optical disc, the device comprising: a first photoelectric conversion means for photoelectric conversion of reflected light from an optical disc of the laser beam emitted from a laser beam source; a second photoelectric conversion means for photoelectric conversion of part of the laser beam emitted from the laser beam source and for changing the gain as a function of the output of the laser beam source; a filter means for cutting out the DC component of the second signal obtained from the second photoelectric conversion means; and a laser noise elimination means for eliminating the laser noise contained in the first signal obtained from the first photoelectric conversion means by using the output signal of the filter means; the circuit being adapted to raise the gain of the second photoelectric conversion means to operate the laser noise elimination means when the output of the laser beam source becomes low.

With a laser noise elimination circuit and an optical disc device comprising such a circuit according to the invention, reflected light of a laser beam from the optical disc mounted in the optical disc device is modulated by the recorded signal of the optical disc and carries a laser noise. Therefore, the first signal, or the RF signal, obtained by photoelectric conversion of the reflected light contains the laser noise. On the other hand, the second signal, or the FPD signal, obtained by photoelectric conversion of part of the laser beam also contains the laser noise as well as a DC component. Thus, only the laser noise is extracted by cutting out the DC component from the FPD signal by the filter means, so that it is possible to obtain an RF signal in which the laser noise is reduced and the DC component is not cut out by subtracting the laser noise from the RF signal. It is possible to raise the level of the laser noise contained in the second signal, or the FPD signal, to make it flush with the laser noise contained in the RF signal by raising the gain of the second photoelectric conversion means in a reproduction mode of the optical disc device when the output level of the laser beam source is reduced. Therefore, it is possible to efficiently and effectively eliminate the laser noise from the RF signal and, at the same time, raise the level of the FPD output that falls in a reproduction mode of the optical disc device so as to make the APC operation highly accurate. Additionally, the amplitude level of the second signal, or the FPD signal, is prevented from rising too high, so that consequently the circuit is prevented from being saturated and a smooth APC operation can be realized by reducing the gain of the second photoelectric conversion means in a write mode for writing data onto the optical disc when the output level of the laser beam source rises.

Thus, according to the present invention, it is possible to always effectively eliminate the laser noise from the RF signal and, at the same time, raise the FPD output level that falls in a reproduction mode by cutting out the DC component of the FPD signal that is obtained by photoelectric conversion of part of the laser beam and subtracting the FPD signal from the RF signal obtained by photoelectric conversion of reflected light from the optical disc of the laser beam emitted from a laser beam source and by raising the gain when the laser beam is partly subjected to photoelectric conversion in a write mode of the optical disc device for writing data onto the optical disc when the output level of the laser beam source falls. Then, a highly accurate APC operation can be realized.

Additionally, the FPD circuit can be prevented from being saturated by reducing the gain of the second photoelectric conversion means in a write mode for writing data onto the optical disc when the output level of the laser beam source rises because the amplitude level of the second signal, or the FPD signal, does not rise too high. Then, a highly smooth APC operation can be realized.

DETAILED DESCRIPTION OF THE PREFERRED EMBODIMENTS

According to the invention, it is possible to always effectively eliminate the laser noise from the RF signal and, at the same time, achieve the objective of realizing a highly smooth APC operation, while maintaining an appropriate FPD output level, by raising the gain of the FPD signal obtained by photoelectric conversion of part of the laser beam and cutting out the DC component of the FPD signal and subtracting the FPD signal from the RF signal obtained by photoelectric conversion of reflected light from the optical disc of the laser beam emitted from a laser beam source. The objective can also be achieved by reducing the gain of the FPD signal in a write mode for writing data onto the optical disc.

First Embodiment

Figure 1:
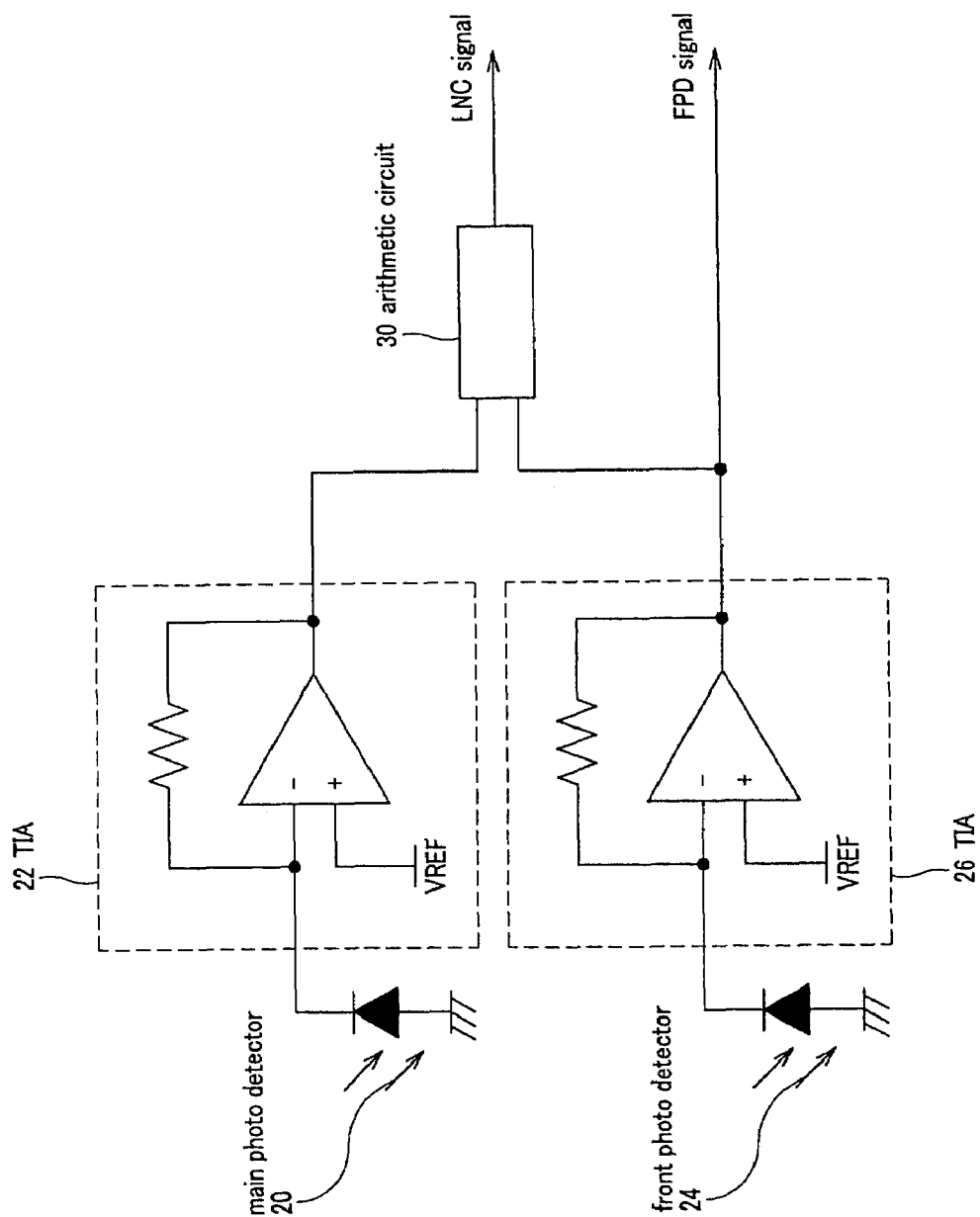
FIG. 1 is a schematic circuit diagram of a known laser noise elimination circuit, illustrating the configuration thereof.
Figure 2:
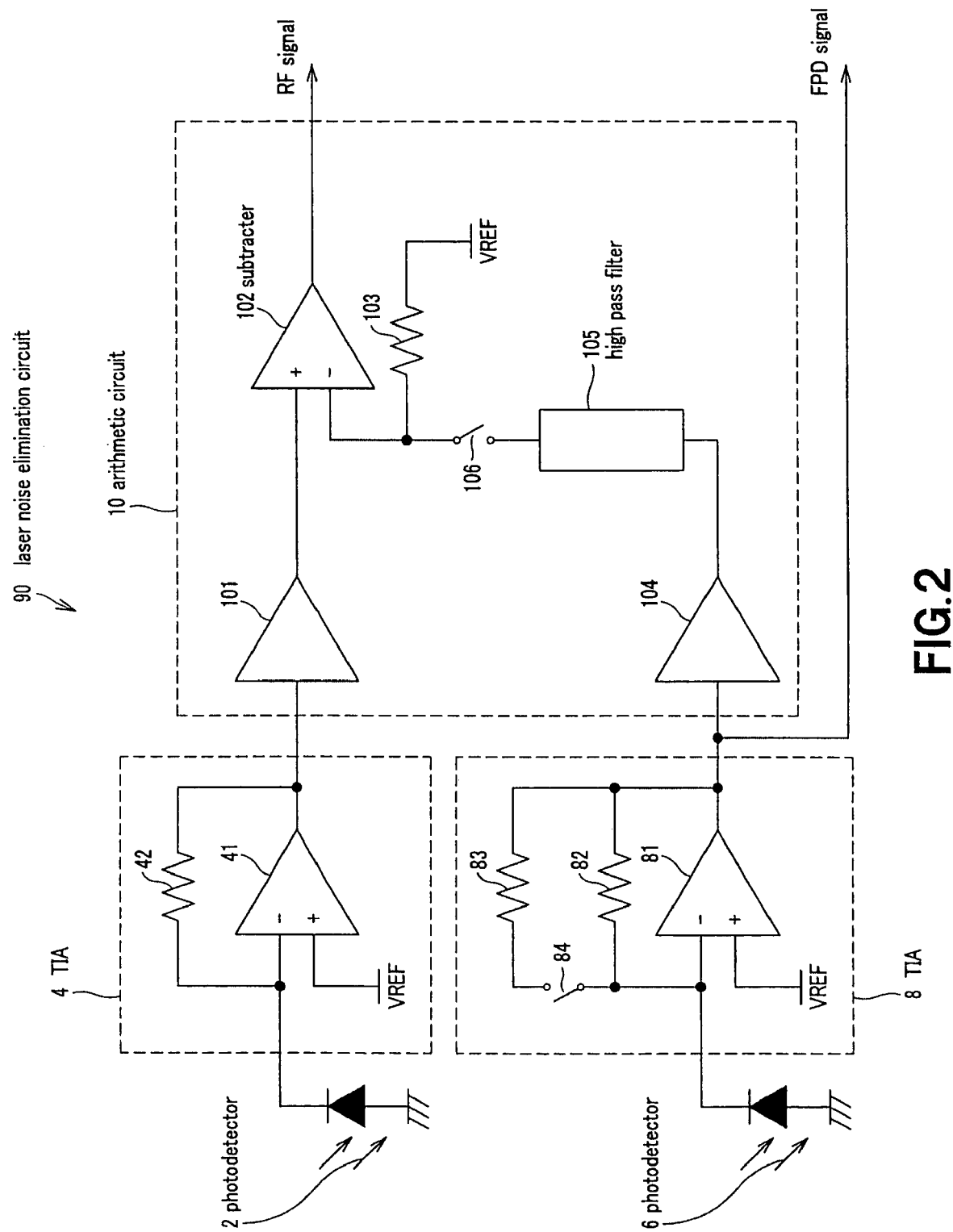
FIG. 2 is a schematic circuit diagram of the first embodiment of a laser noise elimination circuit according to the invention, illustrating the configuration thereof.

FIG. 2 is a schematic circuit diagram of the first embodiment of laser noise elimination circuit according to the invention, illustrating the configuration thereof. Referring to FIG. 2, laser noise elimination circuit 90 comprises a photo detector 2 for receiving reflected light of the laser beam emitted from a laser beam source (not shown) for a semiconductor laser and the like and irradiated onto an optical disc (not shown) for photoelectric conversion, a TIA 4 for converting the electric current signal output from the photo detector 2 into a voltage signal, a photo detector 6 for receiving part of the laser beam emitted from the laser beam source for photoelectric conversion, a TIA 8 for converting the electric current signal output from the photo detector 6 into a voltage signal and an arithmetic circuit 10 for eliminating the laser noise component contained in the RF signal input from the TIA 4 by means of the RF signal and the FPD signal input from the TIA 8. Note that the first photoelectric conversion means corresponds to the photo detector 2 and the TIA 4 of the first embodiment and the second photoelectric conversion means in corresponds to the photo detector 6 and TIA 8 of the first embodiment, while the laser noise elimination means, the subtraction means and the filter means in correspond respectively to the arithmetic circuit 10, the subtracter 102 and the high pass filter 105 of the first embodiment.

The TIA 4 has an operational amplifier 41 and a feedback resistor 42. The TIA 8 has an operational amplifier 81, feedback resistors 82, 83 and a switch 84 for changing the feedback resistance value. The arithmetic circuit 10 has an amplifier 101, a subtracter 102, a resistor 103 for connecting the inverted input terminal of the subtracter 102 to a reference voltage (VREF), an amplifier 104, a high pass filter 105 and a switch 106 for selecting either elimination of laser noise or non-elimination of laser noise.

Now, the operation of this embodiment will be described below. When the optical disc device, in which this embodiment of laser noise elimination circuit 90 is mounted, is in a reproduction mode (for reading data), the switch 84 is held off whereas the switch 106 is held on. The photo detector 2 receives reflected light of the laser beam emitted from the laser beam source and irradiated onto the optical disc for photoelectric conversion and outputs the obtained current signal to the inverted input terminal of the operational amplifier 41 of the TIA 4. The non-inverted input terminal of the operational amplifier 41 is connected to the reference voltage (VREF). The TIA 4 converts the input photoelectric conversion current into a voltage signal as a RF signal and outputs it to the arithmetic circuit 10.

The photo detector 6 receives part of the laser beam emitted from the semiconductor laser for photoelectric conversion and outputs the obtained current signal to the inverted input terminal of the operational amplifier 81 of the TIA 8. The non-inverted input terminal of the operational amplifier 81 is connected to the reference voltage. The TIA 8 converts the input photoelectric conversion current into a voltage signal as a FPD signal and outputs it to the arithmetic circuit 10. The feedback resistance value of the operational amplifier 81 of the TIA 8 is held high to provide a large gain so that it is possible to output a voltage signal higher than a predetermined level to the arithmetic circuit 10 if the current signal input from the photo detector 6 shows a low level.

In the arithmetic circuit 10, the amplifier 101 amplifies the input RF signal and inputs it to the non-inverted input terminal of the subtracter 102, while concurrently the amplifier 104 amplifies the input FPD signal and the high pass filter 105 cuts out the DC component of the FPD signal and subsequently inputs the FPD signal to the inverted input terminal of the subtracter 102. Thus, since the subtracter 102 subtracts the FPD signal, from which the DC component is cut out, from the RF signal, the laser noise that is commonly carried by the RF signal and the FPD signal is cancelled so that the output RF signal shows a reduced laser noise level.

The gain of the TIA 8 is boosted in a reproduction mode, as described above, in order to obtain an FPD signal showing a high level and, at the same time, make the noise level of the RF signal matches that of the FPD signal at the input section of the arithmetic circuit 10 so as to raise the extent of cancellation of the laser noise. If the noise levels are not made to match each other and the FPD signal maintains the noise level at the time of signal recording, the noise level of the FPD signal is very low if compared with that of the RF signal, because the gain of the TIA 8 is made very low at the time of signal recording, as will be described hereinafter. The FPD signal is required at the time of signal reproduction, and the APC operation can be conducted with ease when the gain of the TIA 8 is raised to, in turn, raise the FPD signal level, because then it is possible to obtain a FPD signal showing a high level even at the time of signal reproduction when the laser power is relatively low.

On the other hand, the optical disc device is in a write mode, the switch 106 is held off and the switch 84 is held on so that the feedback resistance of the operational amplifier 81 of the TIA 8 is low and the gain thereof is also low. Thus, if a large speed multiple is used to raise the laser output and hence the electric current signal output from the photo detector 6 in a write mode, the FPD signal output from the TIA 8 does not show any excessively high level. Therefore, consequently, the FPD circuit is prevented from being internally saturated and, at the same time, a wide dynamic range is secured. Since the switch 106 is held off, the arithmetic circuit 10 does not operate for elimination of laser noise and the RF signal input from the TIA 4 is made to simply pass through the subtracter 102 before it is output. The arithmetic circuit 10 is not operated for elimination of laser noise because the LD emission power fluctuates enormously at the time of information recording, so that it is extremely difficult to make the FPD signal level constantly and appropriately match the RF signal level that fluctuates as a function of the power fluctuations, and also because the laser noise at the time of write power emission is very small relative to the RF signal if compared with the laser noise at the time of read power emission, so that the influence of laser noise can be neglected. Note that the noise of the RF signal may be boosted and other adverse effects may arise if the noise canceling operation is conducted in a write mode.

Thus, with this embodiment, it is possible to make the noise level of the FPD signal match that of the RF signal at the input section of the arithmetic circuit 10 because the gain of the TIA 14 is raised in a reproduction mode and, at the same time, the DC component of the FPD signal is not subtracted from the RF signal when the subtracter 102 subtracts the FPD signal from the RF signal because the DC component is cut out by the high pass filter 105 in advance. Thus, the subtracter 102 outputs the RF signal of which the laser noise is reduced and which retains the DC component of the FPD signal, so that the servo signal generated from the RF signal in a downstream step does not show any offset and hence the servo operation including the focus control operation and the tracking control operation of the optical pickup can be conducted highly accurately. Additionally, a signal showing a high level can be produced even at the time of signal reproduction when the laser power is low to facilitate the APC control operation by raising the gain of the TIA 8 and the level of the FPD signal.

Still additionally, it is possible to realize a normal and smooth APC operation because the FPD circuit is prevented from being saturated and a wide dynamic range is secured by selecting a low gain for the TIA 8 in a write mode.

Second Embodiment

Figure 3:
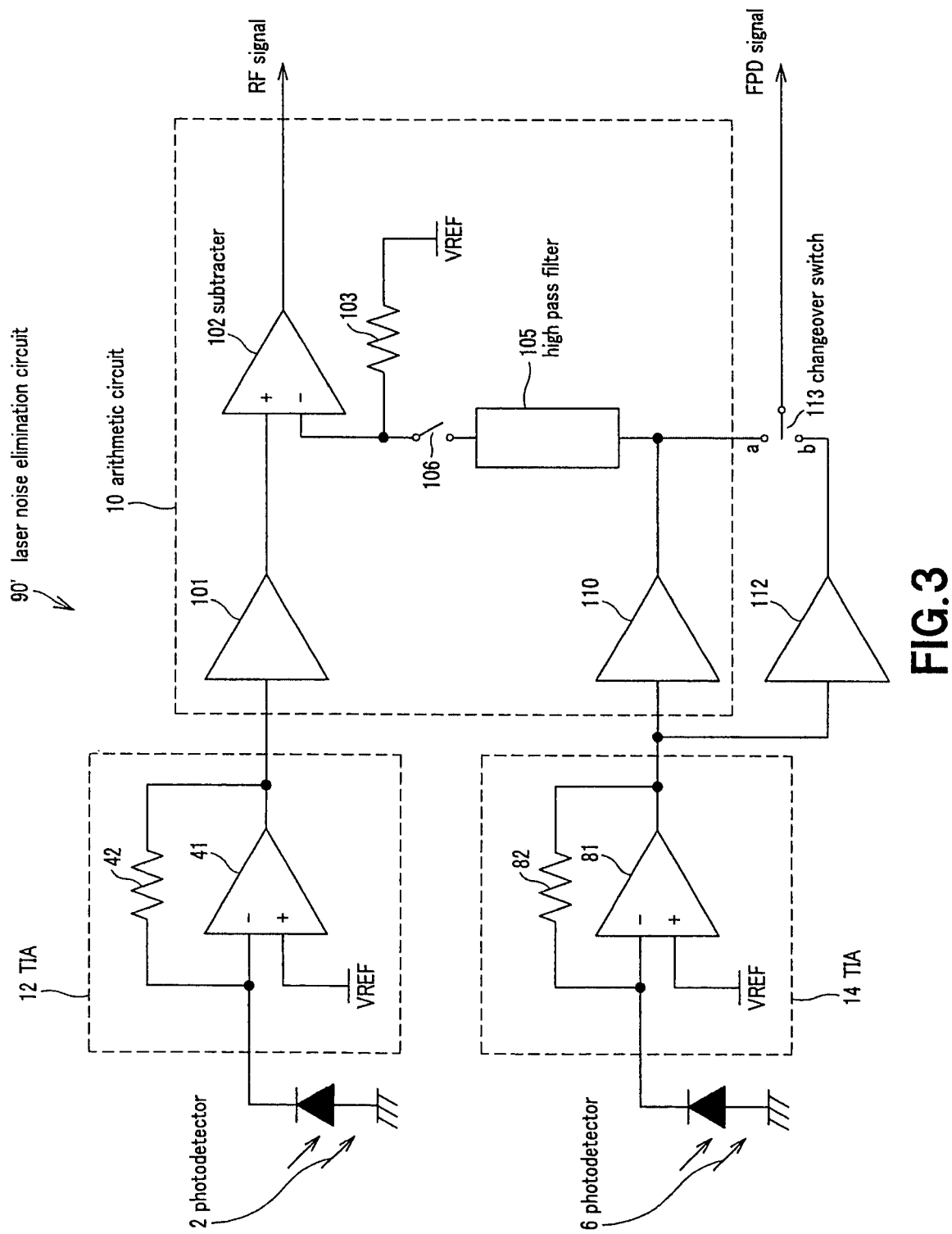
FIG. 3 is a schematic circuit diagram of the second embodiment of a laser noise elimination circuit according to the invention, illustrating the configuration thereof.

FIG. 3 is a schematic circuit diagram of the second embodiment of laser noise elimination circuit according to the invention, illustrating the configuration thereof. Note that the components same as those of the first embodiment of FIG. 2 are denoted respectively by the same reference symbols and will not be described any further. While a laser noise elimination circuit 90' of this embodiment operates same as the first embodiment and provides advantages similar to those of the first embodiment, its configuration slightly differs from the first embodiment. While the TIA 14 of the laser noise elimination circuit 90' of this embodiment is made to show a fixed gain, the laser noise elimination circuit 90' comprises two signal routes for transmitting the FPD signal output from the TIA 14 including one for transmitting the signal to high pass filter 105 and then to the subtracter 102 and also to a changeover switch 113 by way of an amplifier 110 showing a high gain and one for transmitting the signal to the changeover switch 113 by way of an amplifier 112 showing a low gain so as to select the FPD signal to be output to the downstream (not shown) by means of the changeover switch 113. Note that the gain control means corresponds to the amplifiers 110, 112 and the changeover switch 113.

In a reproduction mode, the switch 106 for operating the laser noise eliminating function is held on and the changeover switch 113 is turned to the side of terminal a. The low level FPD signal output from the TIA 14 is amplified by the high gain amplifier 110 to show a sufficiently high level and output to the subtracter 102 by way of the high pass filter 105. With this arrangement, the noise level of the FPD signal is made to match that of the RF signal at the input section of the arithmetic circuit 10 and the DC component of the FPD signal is cut out by the high pass filter 105 so that the second embodiment provides advantages similar to those of the first embodiment. Additionally, a high level FPD signal is output to the downstream by the changeover switch 113 to realize a stable APC control operation.

In a write mode, on the other hand, the switch 106 for operating the laser noise eliminating function is held off and the changeover switch 113 is turned to the side of terminal b. As a result, if the FPD signal output from the TIA 14 shows a high level, the level of the FPD signal does not become excessively high and the FPD circuit is prevented from being saturated to secure a wide dynamic range and realize a normal and smooth APC operation because the FPD signal is amplified by the amplifier 112 showing a low gain and output to the downstream by way of the changeover switch 113.

Third Embodiment

Figure 4:
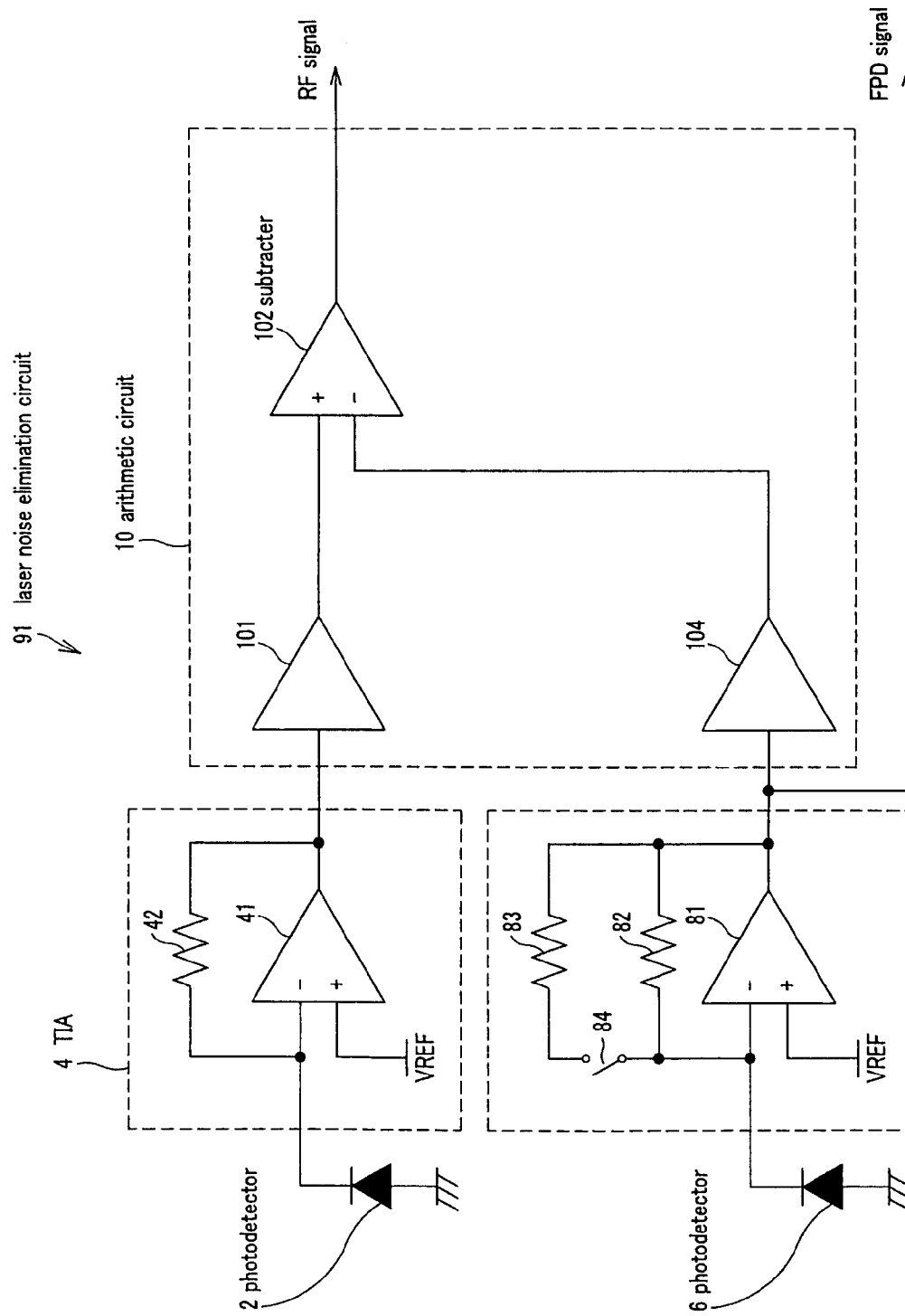
FIG. 4 is a schematic circuit diagram of the third embodiment of a laser noise elimination circuit according to the invention, illustrating the configuration thereof.

FIG. 4 is a schematic circuit diagram of the third embodiment of a laser noise elimination circuit according to the invention, illustrating the configuration thereof. Note that the components that are the same as those of the first embodiment of FIG. 2 are denoted respectively by the same reference symbols and will not be described any further. The arithmetic circuit 10 may be made free from a high pass filter as in the case of the laser noise elimination circuit 91 of this embodiment depending on the accuracy of servo operation of the optical pickup.

In this embodiment, the noise level of the FPD signal is made to match that of the RF signal at the input section of the arithmetic circuit 10 so as to obtain a signal showing a high power level in a reproduction mode where the laser power is low and facilitate the APC control operation by raising the gain of the TIA 8 and hence the level of the FPD signal in a reproduction mode. Additionally, the FPD circuit is prevented from being saturated to secure a wide dynamic range and realize a normal and smooth APC operation because the gain of the TIA 8 is held low in a write mode but held high in a read mode.

Fourth Embodiment

Figure 5:
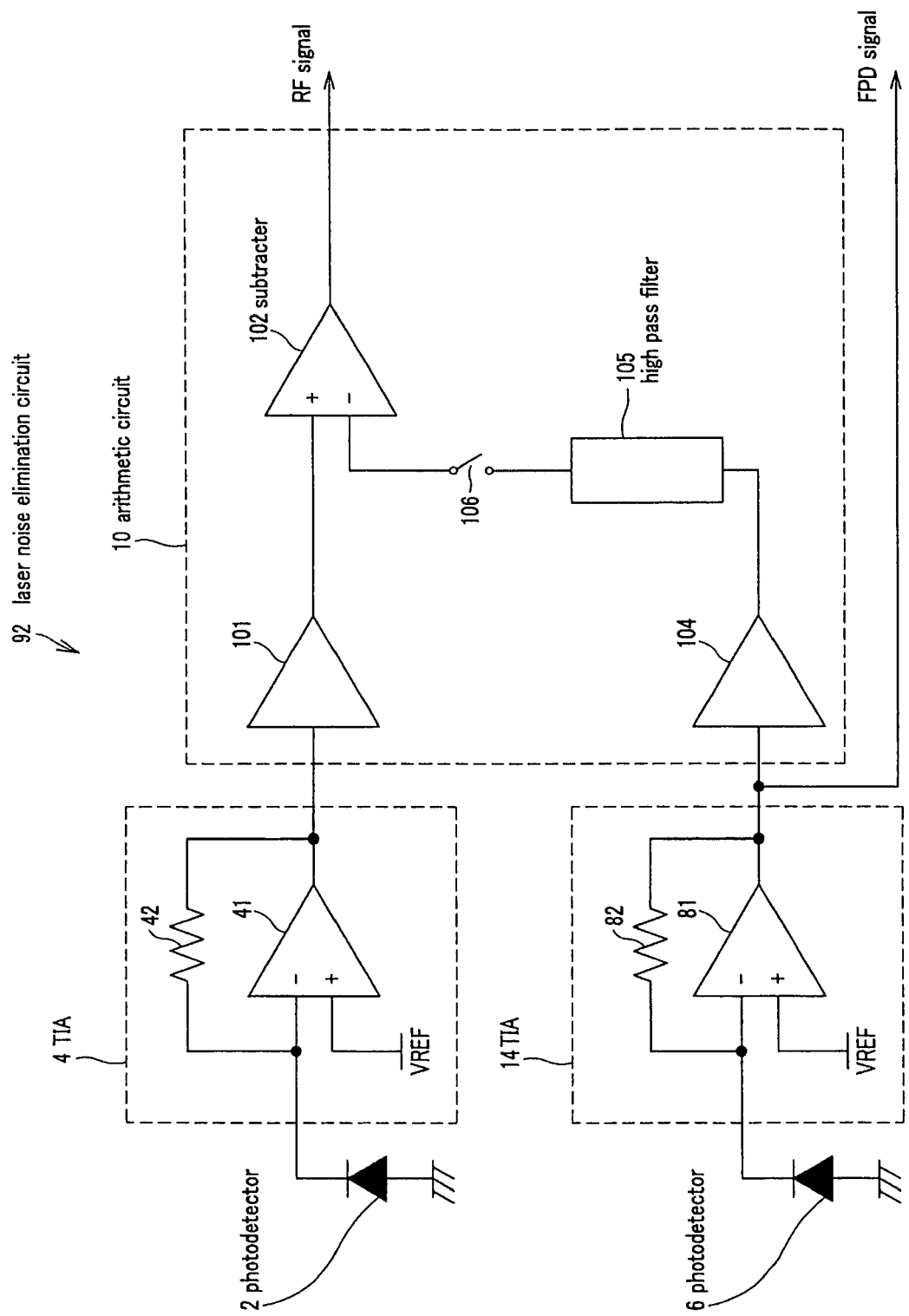
FIG. 5 is a schematic circuit diagram of the fourth embodiment of a laser noise elimination circuit according to the invention, illustrating the configuration thereof.

FIG. 5 is a schematic circuit diagram of the fourth embodiment of laser noise elimination circuit according to the invention, illustrating the configuration thereof. Note that the components same as those of the first embodiment of FIG. 2 are denoted respectively by the same reference symbols and will not be described any further. When the speed multiple is small in a write mode, the gain of the TIA 14 may be made not variable but fixed as in the case of the laser noise elimination circuit 92 of this embodiment to make the noise level of the FPD signal match that of the RF signal. This arrangement allows a normal and smooth APC operation because the output level of the photo detector 6 will never rise significantly in a write mode if compared with the output level of the signal in a reproduction mode. Since the FPD signal matches the RF signal in terms of signal level in a reproduction mode, this embodiment provides advantages similar to those of the embodiment of FIG. 2. Particularly, since the DC component of the FPD signal is cut out by the high pass filter 105, the DC component is not subtracted from the RF signal and hence the servo signal is made free from any offset so that a highly accurate servo operation can be conducted for the optical pickup.

It will be appreciated that the present invention is by no means limited to the above-described embodiments, which may be modified in various different ways without departing from the scope of the present invention, and other embodiments may be conceivable in terms of specific configuration, functions, effects and advantages.

What is claimed is:

1. A laser noise elimination circuit comprising:
a first photoelectric converter adapted to convert a first part of a laser beam emitted from a laser beam source into a first signal;
a second photoelectric converter adapted to convert a second part of the laser beam emitted from the laser beam source into a second signal;
an arithmetic circuit adapted to output an RF signal, said RF signal during a write mode being said first signal,
wherein said RF signal during a read mode is the difference between said first signal and a filtered second signal, said second signal absent a direct current component being said filtered second signal.

2. The circuit according to claim 1, wherein a gain of the second photoelectric converter during said read mode differs from a gain of the second photoelectric converter during said write mode.

3. The circuit according to claim 1, wherein said laser beam emitted from the laser beam source is reflected from an optical disc, data being read from said optical disc during a read mode and being written to said optical disc during a write mode.

4. The circuit according to claim 3, wherein an amplification level of said second signal during said read mode differs from an amplification level of said second signal during said write mode.

5. The circuit according to claim 3, wherein a gain of the second photoelectric converter during said read mode is greater than a gain of the second photoelectric converter during said write mode.

6. The circuit according to claim 3, wherein an amplification level of said second signal during said read mode is greater than an amplification level of said second signal during said write mode.

7. The circuit according to claim 3, wherein said first photoelectric converter is adapted to photoelectric convert said first part of the laser beam into a first current, said first current being converted into said first signal.

8. The circuit according to claim 7, wherein an amplification level of said first current during said read mode is greater than an amplification level of said first current during said write mode.

9. The circuit according to claim 3, wherein said second photoelectric converter is adapted to photoelectric convert said second part of the laser beam into a second current, said second current being converted into said second signal.

10. The circuit according to claim 9, wherein an amplification level of said second current during said read mode is greater than an amplification level of said second current during said write mode.

11. An optical disc device comprising:
the circuit according to claim 3; and
a laser beam source adapted to emit the laser beam onto the optical disc.

12. A laser noise elimination circuit comprising:
a first photoelectric converter configured to convert a first part of a laser beam emitted from a laser beam source into a first signal,
wherein an RF signal during a read mode is the difference between said first signal and a second signal, said RF signal during a write mode being said first signal,
wherein a direct current component is absent from said second signal.

13. The circuit according to claim 12, wherein an amplification level of said second signal during said read mode differs from an amplification level of said second signal during said write mode.

14. The circuit according to claim 12, wherein an amplification level of said second signal during said read mode is greater than an amplification level of said second signal during said write mode.

15. The circuit according to claim 12, wherein said laser beam emitted from the laser beam source is reflected from an optical disc, data being read from said optical disc during said read mode and being written to said optical disc during said write mode.

16. The circuit according to claim 12, wherein said first photoelectric converter is configured to photoelectric convert said first part of the laser beam into a first current, said first current being converted into said first signal.

17. The circuit according to claim 16, wherein an amplification level of said first current during said read mode is greater than an amplification level of said first current during said write mode.

18. The circuit according to claim 12, wherein a second photoelectric converter configured to convert a second part of the laser beam emitted from the laser beam source into said second signal.

19. The circuit according to claim 18, wherein said second photoelectric converter is configured to photoelectric convert said second part of the laser beam into a second current, said second current being converted into said second signal.

20. The circuit according to claim 19, wherein an amplification level of said second current during said read mode is greater than an amplification level of said second current during said write mode.

21. The circuit according to claim 18, wherein a gain of the second photoelectric converter during said read mode differs from a gain of the second photoelectric converter during said write mode.

22. The circuit according to claim 18, wherein said gain of the second photoelectric converter during said read mode is greater than said gain of the second photoelectric converter during said write mode.

23. An optical disc device comprising:

the circuit according to claim 12; and a laser beam source adapted to emit the laser beam onto the optical disc.

* * * * *